United States Patent
Ye

(10) Patent No.: US 11,460,968 B2
(45) Date of Patent: Oct. 4, 2022

(54) TOUCH CONTROL DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Jian Ye, Wuhan (CN)

(73) Assignee: WUHAN CHINA STAR OPTOELECTRONICS SEMICONDUCTOR DISPLAY TECHNOLOGY, Wuhan (CN)

( * ) Notice: Subject to any disclaimer, the term of this patent is extended or adjusted under 35 U.S.C. 154(b) by 0 days.

(21) Appl. No.: 17/265,132

(22) PCT Filed: Sep. 25, 2020

(86) PCT No.: PCT/CN2020/117677
§ 371 (c)(1),
(2) Date: Feb. 1, 2021

(87) PCT Pub. No.: WO2022/016703
PCT Pub. Date: Jan. 27, 2022

(65) Prior Publication Data
US 2022/0155905 A1   May 19, 2022

(30) Foreign Application Priority Data
Jul. 24, 2020 (CN) .......................... 202010721338.1

(51) Int. Cl.
*G06F 3/044* (2006.01)
(52) U.S. Cl.
CPC .......... *G06F 3/0446* (2019.05); *G06F 3/0448* (2019.05)

(58) Field of Classification Search
CPC ............................ G06F 3/0446; G06F 3/0448
(Continued)

(56) References Cited

U.S. PATENT DOCUMENTS

| 2016/0216806 A1* | 7/2016 | Nakamura | ............ G06F 3/0448 |
| 2016/0274727 A1* | 9/2016 | Nakamura | ............ G06F 3/0448 |

(Continued)

FOREIGN PATENT DOCUMENTS

| CN | 102566845 A | 7/2012 |
| CN | 103221910 A | 7/2013 |

(Continued)

OTHER PUBLICATIONS

Han Yun Touch unit, color film substrate and liquid crystal display Mar. 22, 2017 Wuhan China Star Optoelectronics Technology Co LTD CN106526935 (A)—Touch unit, color film substrate and liquid crystal display paragraphs 34-37 English.*

(Continued)

*Primary Examiner* — Prabodh M Dharia
(74) *Attorney, Agent, or Firm* — The Roy Gross Law Firm, LLC; Roy Gross

(57) ABSTRACT

A touch control display device includes a touch control layer. The touch control layer includes a plurality of touch control units. Each of the touch control units includes a first electrode and a second electrode, and the first electrode and the second electrode form a node mutual capacitance. Electrical resistance and parasitic capacitance of the first electrode of each of the touch control units and electrical resistance and parasitic capacitance of the second electrode of each of the touch control units are optimized to reduce a charging time taken by the node mutual capacitance to reach a predetermined voltage.

17 Claims, 8 Drawing Sheets

(58) Field of Classification Search
USPC .......................................................... 345/173
See application file for complete search history.

(56) References Cited

U.S. PATENT DOCUMENTS

| 2017/0207279 | A1* | 7/2017 | Zeng | ..................... G06F 3/0445 |
| 2017/0364187 | A1* | 12/2017 | Zhai | ..................... G06F 3/0446 |
| 2018/0358578 | A1* | 12/2018 | Li | ....................... H01L 51/5265 |
| 2018/0364851 | A1* | 12/2018 | Yeh | ..................... G06F 3/0447 |
| 2021/0064186 | A1* | 3/2021 | Lin | ..................... G02F 1/13338 |

FOREIGN PATENT DOCUMENTS

| CN | 109766024 A | 5/2019 |
| CN | 111596804 A | 8/2020 |

OTHER PUBLICATIONS

Han Yun Touch unit, color film substrate and liquid crystal display Mar. 22, 2017 Wuhan China Star Optoelectronics Technology Co LTD CN106526935 (A)—Touch unit, color film substrate and liquid crystal display figures 1,2, paragraphs 34-37, Chinese.*

* cited by examiner

TOUCH CONTROL DISPLAY DEVICE

CROSS REFERENCE TO RELATED APPLICATIONS

This application is a National Phase of PCT Patent Application No. PCT/CN2020/117677 having International filing date of Sep. 25, 2020, which claims the benefit of priority of Chinese Application No. 202010721338.1 filed Jul. 24, 2020. The contents of the above applications are all incorporated by reference as if fully set forth herein in their entirety.

FIELD

The present disclosure relates to the field of touch control technologies, and more particularly, relates to a touch control display device.

BACKGROUND

Due to high durability, long life period, and capability to achieve a multi-touch function, capacitive touch control screens are widely used in interactive devices. In terms of the capacitive touch control screens, a higher touch report rate offers users a smoother operation. On the contrary, a lower touch report rate offers the users a more unfavorable operation.

Therefore, it is necessary to provide a technical solution to increase a touch report rate of the touch control display devices.

SUMMARY

The present disclosure aims to provide a touch control display device which has a high touch report rate.

To achieve the above goal, the present disclosure provides a touch control display device including a touch control layer. The touch control layer includes a plurality of touch control units, each of the touch control units includes a first electrode disposed along a first direction and a second electrode disposed along a second direction, the first electrode and the second electrode are electrically insulated, the first direction and the second direction are different.

In each of the touch control units, an electrical resistance of the first electrode is greater than 0Ω and is less than or equal to 50Ω, and a parasitic capacitance of the first electrode is greater than 0 pF and is less than or equal to 18 pF.

An electrical resistance of the second electrode is greater than 0Ω and is less than or equal to 50Ω, and a parasitic capacitance of the second electrode is greater than 0 pF and is less than or equal to 18 pF.

The parasitic capacitance of the first electrode is less than the parasitic capacitance of the second electrode, the first electrode is a driving electrode, and the second electrode is a sensing electrode.

In the above touch control display device, in each of the touch control units, the electrical resistance of the first electrode is greater than or equal to 5Ω and is less than or equal to 35Ω, and the parasitic capacitance of the first electrode is greater than or equal to 2 pF and is less than or equal to 17 pF.

The electrical resistance of the second electrode is greater than or equal to 5Ω and is less than or equal to 35Ω, and the parasitic capacitance of the second electrode is greater than or equal to 2 pF and is less than or equal to 17 pF.

In the above touch control display device, the touch control display device further includes a first leading line, a second leading line, and a touch control chip, wherein the first leading line is electrically connected to the first electrode of each of the touch control units, the second leading line is electrically connected to the second electrode of each of the touch control units, the first leading line and the second leading line are electrically connected to the touch control chip, and an electrical resistance of the first leading line and an electrical resistance of the second leading line are greater than 0Ω and are less than or equal to 2500Ω.

In the above touch control device, in each of the touch control units, the electrical resistance of the first electrode is greater than or equal to 8Ω and is less than or equal to 30Ω, and the parasitic capacitance of the first electrode is greater than or equal to 5 pF and is less than or equal to 13 pF.

The electrical resistance of the second electrode is greater than or equal to 8Ω and is less than or equal to 30Ω, and the parasitic capacitance of the second electrode is greater than or equal to 5 pF and is less than or equal to 13 pF.

The electrical resistance of the first leading line and the electrical resistance of the second leading line are greater than or equal to 100Ω and are less than or equal to 2000Ω.

The electrical resistance of the first leading line and the electrical resistance of the second leading line are greater than or equal to 200Ω and are less than or equal to 2200Ω.

In the above touch control display device, in each of the touch control units, the first electrode and the second electrode form a node mutual capacitance, and a charging time taken by the node mutual capacitance to a predetermined voltage is less than or equal to a threshold duration of time.

In the above touch control display device, the touch control display device further includes a touch control chip, wherein a percent ratio of the predetermined voltage to an input voltage ranges from 90% to 100%, the threshold duration of time is less than 1.5 μs and is greater than 0 μs, and the input voltage is outputted from the touch control chip to the touch control units.

In the above touch control display device, the percent ratio of the predetermined voltage to the input voltage is 95%, and the threshold duration of time is 1.35 μs.

In the above touch control display device, a number of the touch control units arranged at a same row along the first direction is greater than a number of the touch control units arranged at a same row along the second direction.

In the above touch control display device, in each of the touch control units, an area of the first electrode is less than an area of the second electrode.

In the above touch control display device, the first electrode includes a first stem electrode extending along the first direction and at least one first branch electrode extending from the first stem electrode.

The second electrode includes a second stem electrode extending along the second direction and at least one second branch electrode extending from the second stem electrode.

In the above touch control display device, a floating electrode is disposed in the first stem electrode, and/or a floating electrode is disposed in at least one of the at least one first branch electrode, and/or a floating electrode is disposed in at least one of the at least one second branch electrode, and/or the floating electrode, the first electrode, and the second electrode are electrically insulated from each other.

In the above touch control display device, the floating electrode is disposed in at least one of the at least one first branch electrode, and/or the floating electrode is disposed in at least one of the at least one second branch electrode.

In the above touch control display device, the second electrode further includes a first connecting branch electrode, an end of the first connecting branch electrode is connected to the second stem electrode, another end of the first connecting branch electrode is connected to the second branch electrode, an area surrounded by the first connecting branch electrode, the second stem electrode, and the at least one second branch electrode of each of the touch control units is provided with a floating electrode, and the floating electrode, the first electrode, and the second electrode are electrically insulated.

In the above touch control display device, the second electrode further includes a second connecting branch electrode, an end of the second connecting branch electrode is connected to the at least one second branch electrode, another end of the second connecting branch electrode is electrically connected to the second connecting branch electrode of the touch control units which are adjacent to each other along the second direction, and an area surrounded by the first connecting branch electrode, the second connecting branch electrode, the at least one second branch electrode, and the second stem electrode in each of the touch control units is provided with the floating electrode.

In the above touch control display device, the at least one second branch electrode extends from an end of the second stem electrode near an intersection between the second stem electrode and the first stem electrode. In the second direction, two adjacent ones of the second branch electrodes of two adjacent ones of the touch control units are connected to each other at ends of the two adjacent ones of the second branch electrodes away from other ends of the two adjacent ones of the second branch electrodes connected to the second stem electrode, a region surrounded by two adjacent ones of the second branch electrodes and two adjacent ones of the second stem electrodes of two adjacent ones of the touch control units is provided with a floating electrode, and the floating electrode, the first electrode, and the second electrode are electrically insulated from each other.

In the above touch control display device, at least one of the first stem electrode or the second stem electrode is provided with an extended-width part near an intersection between the first electrode and the second electrode.

In the above touch control display device, the touch control display device further includes a display panel, the touch control layer is disposed on a side of the display panel, the display panel includes an organic light-emitting diode (OLED) array layer and an encapsulation layer, the encapsulation layer is disposed between the touch control layer and the OLED array layer, and a thickness of the encapsulation layer ranges from 5 µm to 15 µm.

Regarding the beneficial effects: the present disclosure provides a touch control display device, including a touch control layer. The touch control layer includes a plurality of touch control units. Each of the touch control units includes a first electrode and a second electrode which are electrically insulated from each other. In each of the touch control units, an electrical resistance of the first electrode is greater than $0\Omega$ and is less than or equal to $50\Omega$, a parasitic capacitance of the first electrode is greater than 0 pF and is less than or equal to 18 pF, an electrical resistance of the second electrode is greater than $0\Omega$ and is less than or equal to $50\Omega$, and a parasitic capacitance of the second electrode is greater than 0 pF and is less than or equal to 18 pF. The electrical resistance and the parasitic capacitance of the first electrode of each of the touch control units and the electrical resistance and the parasitic capacitance of the second electrode of each of the touch control units are optimized. Therefore, a charging time taken by a node mutual capacitance between the first electrode and the second electrode of each of the touch control units is reduced, a mutual capacitance scan time of each of the touch control units is reduced, and a touch report rate of the touch control display device is increased.

DETAILED DESCIPTION

Figure 1:
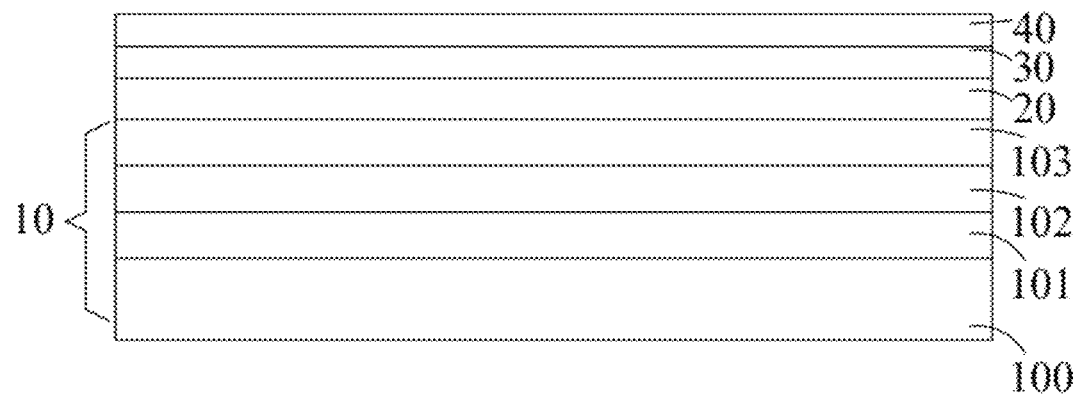
FIG. 1 is a schematic view of a touch control display device provided by the present disclosure.

Hereinafter preferred embodiments of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure.

The present disclosure provides a touch control display device which may be a flexible touch control display device or a rigid touch control display device. The touch control display device includes a touch control layer and a display panel, and the touch control layer is disposed on a side of the display panel.

The touch control layer includes a plurality of touch control units arranged in an array manner. Each of the touch control layers includes a first electrode arranged along a first direction and a second electrode arranged along a second direction. The first electrode and the second electrode are electrically insulated from each other and form a mutual touch control electrode, wherein the first direction and the second direction are different.

In each of the touch control units, an electrical resistance of the first electrode is greater than $0\Omega$ and is less than or equal to $50\Omega$, a parasitic capacitance of the first electrode is greater than 0 pF and is less than or equal to 18 pF, an electrical resistance of the second electrode is greater than 0Ω and is less than or equal to 50Ω, and a parasitic capacitance of the second electrode is greater than 0 pF and is less than or equal to 18 pF. The electrical resistance and the parasitic capacitance of the first electrode of each of the touch control units and the electrical resistance and the parasitic capacitance of the second electrode of each of the touch control units are optimized. Therefore, a charging time taken by a node mutual capacitance between the first electrode and the second electrode of each of the touch control units to reach a predetermined voltage is reduced, and a touch report rate of the touch control display device is increased.

In some embodiments, in each of the touch control units, the electrical resistance of the first electrode is greater than or equal to 5Ω and is less than or equal to 35Ω, the parasitic capacitance of the first electrode is greater than or equal to 2 pF and is less than or equal to 17 pF, the electrical resistance of the second electrode is greater than or equal to 5Ω and is less than or equal to 35Ω, the parasitic capacitance of the second electrode is greater than or equal to 2 pF and is less than or equal to 17 pF.

In some embodiments, in each of the touch control units, the electrical resistance of the first electrode is greater than or equal to 8Ω and is less than or equal to 25Ω, the parasitic resistance of the first electrode is greater than or equal to 5 pF and is less than or equal to 12 pF, the electrical resistance of the second electrode is greater than or equal to 8Ω and is less than or equal to 25Ω, and the parasitic capacitance of the second electrode is greater than or equal to 5 pF and is less than or equal to 12 pF.

In each of the touch control units, the electrical resistance of the first electrode may be 2Ω, 4Ω, 8Ω, 12Ω, 16Ω, 20Ω, 24Ω, 28Ω, 32Ω, 36Ω, 40Ω, 44Ω, or 48Ω. The parasitic capacitance of the first electrode may be 2 pF, 4 pF, 6 pF, 8 pF, 10 pF, 12 pF, 14 pF, or 16 pF. The electrical resistance of the second electrode may be 2Ω, 4Ω, 8Ω, 12Ω, 16Ω, 20Ω, 24Ω, 28Ω, 32Ω, 36Ω, 40Ω, 44Ω, or 48Ω. The parasitic capacitance of the second electrode may be 2 pF, 4 pF, 6 pF, 8 pF, 10 pF, 12 pF, 14 pF, or 16 pF.

In some embodiments, the touch control display device further includes a first leading line, a second leading line, and a touch control chip. The first leading line is electrically connected to the first electrode of each of the touch control units, the second leading line is electrically connected to the second electrode of each of the touch control units. The first leading line, the second leading line, and the touch control chip are electrically connected, and an electrical resistance of the first leading line and the second leading line is greater than 0Ω and is less than or equal to 2500Ω. The less the electrical resistance of the first leading line and the second leading line, the less the resistance of the first leading line and the second leading line, and the smoother the signals being transmitted. By reducing RC-delays caused by resistance of the leading line, the charging time taken by the node mutual capacitances to reach the predetermined voltage can be reduced. The electrical resistance of the first leading line and the second leading line can be reduced by improving conductivity thereof or increasing widths thereof. Also, the electrical resistance of the first leading line and the second leading line can be reduced when they are composed of multi-layer lines.

In some embodiments, the electrical resistance of the first leading line and the second leading line is greater than or equal to 200Ω and is less than or equal to 2200Ω. Specifically, the electrical resistance of the first leading line and the second leading line may be 20Ω, 50Ω, 80Ω, 100Ω, 200Ω, 500Ω, 800Ω, 1200Ω, 1500Ω, 1800Ω, 2200Ω, or 2500Ω.

In some embodiments, in each of the touch control units, the electrical resistance of the first electrode is greater than or equal to 8Ω and is less than or equal to 30Ω, and the parasitic capacitance of the first electrode is greater than or equal to 5 pF and is less than or equal to 13 pF.

The electrical resistance of the second electrode is greater than or equal to 8Ω and is less than or equal to 30Ω, and the parasitic capacitance of the second electrode is greater than or equal to 5 pF and is less than or equal to 13 pF.

The electrical resistance of the first leading line and the second leading line is greater than or equal to 100Ω and is less than or equal to 2000Ω. Because the electrical resistance of the first electrode, the parasitic capacitance of the first electrode, the electrical resistance of the second electrode, the parasitic capacitance of the second electrode, the electrical resistance of the first leading line, and the electrical resistance of the second leading line are optimized and may cooperate with each other, the charging time taken by the node mutual capacitance to reach the predetermined voltage can be reduced.

In some embodiments, the first electrode and the second electrode of each of the touch control units form the node mutual capacitance, and the charging time taken by the node mutual capacitance is less than or equal to a threshold duration of time, thereby reducing the charging time taken by the node mutual capacitances, saving time of mutual scan, and increasing the touch report rate. The less the threshold duration of time, the easier the touch report rate is increased.

In some embodiments, the touch control display device further includes the touch control chip, A percent ratio of the predetermined voltage to an input voltage ranges from 90% to 100%. The threshold duration of time is less than or equal to 1.5 μs and is greater than 0 μs. The input voltage is transmitted into the touch control units from the touch control chip. The predetermined voltage is configured to ensure that the touch control units can work normally, thereby ensuring a basic touch control function. The percent ratio of the predetermined voltage to the input voltage may be 90%, 92%, 95%, 97%, 98%, or 100%. The threshold duration of time may be 0.4 μs, 0.5 μs, 0.55 μs, 0.65 μs, 0.7 μs, 0.9 μs, 1.0 μs, 1.2 μs, 1.25 μs, 1.35 μs, or 1.5 μs.

In some embodiments, the percent ratio of the predetermined voltage to the input voltage is 95%, and the threshold duration of time is 1.35 μs.

Typically, the touch control chip of the touch control display device should work under circumstances in which the charging time taken by the node mutual capacitance is less than or equal to t, wherein t is the charging time taken by the node mutual capacitance to reach the predetermined voltage. If signals cannot satisfy the above circumstances, waveform distortions of corresponding driving signals may occur, affecting detecting accuracy of signals and performance of touch control function.

In some embodiments, a number of the touch control units arranged at a same row along a first direction is greater than a number of the touch control units arranged at a same row along a second direction, and the parasitic capacitance of the first electrode is less than the parasitic capacitance of the second electrode.

When the number of the touch control units arranged at the same row along the first direction is greater than the number of the touch control units arranged at the same row along the second direction, a number of the first electrodes arranged at the same row along the first direction is greater than a number of the second electrodes arranged at the same row along the second direction. By allowing the parasitic capacitance of the first electrodes to be less than the parasitic capacitance of the second electrodes, a parasitic capacitance of a first electrode channel formed from the first electrodes arranged at the same row along the first direction is reduced, which makes electrical signals easy to be transmitted into the first electrode channel. In particular, when the first electrode is a driving electrode, which is configured to input scan signals, a 3RC settling time is easier to be reduced.

In some embodiments, in each of the touch control units, an area of the first electrode is less than an area of the second electrode, so that the parasitic capacitance of the first electrode of each of the touch control units is less than the parasitic capacitance of the second electrode of each of the touch control units.

In some embodiments, first electrode includes a first stem electrode extending along the first direction and a plurality of first branch electrodes extending from the first stem electrode.

The second electrode includes a second stem electrode extending along the second direction and a plurality of second branch electrodes extending from the second stem electrode.

The first stem electrode extends along the first direction and is mainly configured to transmit currents parallel to the first direction. A mutual capacitance is formed between the first branch electrodes and the second branch electrodes, thereby adjusting touch sensitivity.

A function of the second stem electrode and that of the first stem electrode are basically same, and a function of the second branch electrodes and that of the first branch electrodes are basically same. An angle between the first branch electrodes and the first stem electrode is greater than 0° and is less than 90°. For example, it may be 30°, 40°, 45°, 50°, 60°, 70°, or 80°. An angle between the second branch electrodes and the second stem electrode is greater than 0° and is less than 90°. For example, it may be 30°, 40°, 45°, 50°, 60°, 70°, or 80°. Specifically, the angle between the first branch electrodes and the first stem electrode is 45°, and the angel between the second branch electrodes and the second stem electrode is 45°.

In some embodiments, a floating electrode is disposed in the first stem electrode, and/or a floating electrode is disposed in at least one of the first branch electrodes, and/or a floating electrode is disposed in the second stem electrode, and/or a floating electrode is disposed in at least one of the second branch electrodes. The floating electrode, the first electrode, and the second electrode are electrically insulated from each other. By disposing the floating electrode in at least one of the first stem electrode or the first branch electrodes, the area of the first electrode can be reduced, thereby reducing the parasitic capacitance of the first electrode. Furthermore, by disposing the floating electrode in at least one of the second stem electrode or the second branch electrodes, the area of the second electrode can be reduced, thereby reducing the parasitic capacitance of the second electrode.

In some embodiments, the floating electrode is disposed in at least one of the first branch electrodes, and/or the floating electrode is disposed in at least one of the second branch electrodes. By disposing the floating electrode in at least one of the first branch electrodes or the second branch electrodes but not in the first stem electrode or the second stem electrode, not only can the area of the first electrode and/or the second electrode be reduced, but also the electrical resistance of the first electrode and the second electrode can be ensured. The floating electrode in the branch electrodes would not significantly affect electrical resistance of electrodes, but the floating electrode in the stem electrode may increase the electrical resistance of the electrodes.

In some embodiments, the second electrode further includes a plurality of first connecting branch electrodes, an end of the first connecting branch electrodes is connected to the second stem electrode, and another end of the first connecting branch electrodes is connected to the second branch electrode. A region surrounded by the first connecting branch electrode, the second stem electrode, and the second branch electrode is provided with a floating electrode. The floating electrode, the first electrode, and the second electrode are electrically insulated. In each of the touch control units, the first connecting branch electrode added between the second branch electrode and the second stem electrode can be a current transmitting channel on the second electrode that transmits currents, thereby reducing electrical resistance of the second electrode and reducing the charging time taken by the node mutual capacitance to the predetermined voltage. In addition, since the region surrounded by the first connecting branch electrode, the second stem electrode, and the second branch electrode of each of the touch control units is provided with the floating electrode, the area of the second electrode can be reduced, thereby reducing the parasitic capacitance of the second electrode and further reducing the charging time of the node mutual capacitance to the predetermined voltage.

In some embodiments, the second electrode further includes a plurality of second connecting branch electrodes. An end of the connecting branch electrode is connected to the second branch electrode, and another end of the second connecting branch electrode is connected to the second connecting branch electrodes of adjacent touch control units along the second direction. A region surrounded by the first connecting branch electrode, the second connecting branch electrode, the second branch electrode, and the second stem electrode of each of the touch control units is provided with a floating electrode. By disposing the second connecting branch electrode to form a current transmitting channel between two adjacent second electrodes of two touch control units, a resistance of a second electrode channel can be reduced, and the charging time taken by the node mutual capacitance to reach the predetermined voltage is reduced. In addition, since the region surrounded by the first connecting branch electrode, the second connecting branch electrode, the second branch electrode, and the second stem electrode of each of the touch control units is provided with the floating electrode, the parasitic capacitance of the second electrode can be reduced.

In some embodiments, at a position near an intersection between the first electrode and the second electrode, at least one of the first stem electrode or the second stem electrode is provided with an extended-width part, thereby reducing electrical resistance of at least one of the first stem electrode or the second stem electrode near the intersection. As a result, the charging time taken by the node mutual capacitance to reach the predetermined voltage is reduced.

In some embodiments, the touch control display device further includes a display panel, and the touch control layer is disposed on a side of the display panel. The display panel includes an organic light-emitting diode (OLED) array layer and an encapsulation layer. The encapsulation layer is disposed between the touch control layer and the OLED array layer and has a thickness ranging from 5 μm to 15 μm. For example, the thickness of the encapsulation layer may be 6 μm, 8 μm, 10 μm, 12 μm, or 14 μm. By adjusting the thickness of the encapsulation layer, a parasitic capacitance between the first electrode and the second electrode of the touch control layer and a parasitic capacitance of a common cathode of the OLED array layer can be adjusted. The thicker the encapsulation layer, the less the parasitic capacitance.

In some embodiments, the encapsulation includes an organic layer having a thickness ranging from 6 μm to 12 μm. For example, the thickness of the organic layer may be 6 μm, 8 μm, 10 μm, or 11 μm.

It should be noted that the parasitic capacitance of the first electrode and the second electrode is formed from the parasitic capacitance between the first electrode, the second electrode, and the common cathode. A distance between the first electrode and the second electrode is determined by the thickness of the encapsulation layer. When the node mutual capacitance is charged by the driver chip, the parasitic capacitance is also charged. When the parasitic capacitance becomes greater and greater, a target node mutual capacitance is charged to satisfy an electrical signal detection. Specifically, when the node mutual capacitance is charged to a predetermined voltage, a scan time is extended, and therefore a touch report rate is decreased.

In some embodiments, the first electrode is a driving electrode, and second electrode is a sensing electrode.

In some embodiments, the first electrode and the second electrode are formed from a metal grid surrounding a sub-pixel.

Some principles of the present disclosure are illustrated below:

Node mutual capacitance: in each of the touch control units, the first electrode and the second electrode form the node mutual capacitance. The node mutual capacitance includes a mutual capacitance formed between a border of first electrode and a border of the second electrode. Generally, the mutual capacitance formed between the border of the first electrode and the border of the second electrode should be within an appropriate range to ensure a number of touch signals, thereby improving touch performance such as touch sensitivity. The less a basic capacitance formed at an intersection between the first electrode and the second electrode, the easier touch report rate being increased. When the touch control chip drives the driving electrode with an electrical scan signal, a node mutual electrode formed at an intersection between a corresponding driving electrode and a corresponding sensing electrode is charged or discharged. When a finger touches the touch display device, a position touched by the finger is identified according to changes in corresponding node capacitance.

3RC settling time (3RC time constant) is a time constant in which an output signal reaches 95% amplitude of an input signal, and is determined by an amount of an electrical resistance and capacitance of a touch control screen. Wherein, the input signal is a voltage inputted into the touch control chip, and an output signal is a voltage written into the node mutual capacitances. Once a body design of the touch control screen is determined, a corresponding 3RC settling time of each of node mutual capacitances on the touch control screen is determined as well. In general, if the longest charging time taken by a node mutual capacitance on the touch control screen to reach 95% amplitude of an input signal satisfies a predetermined 3RC settling time, other node mutual capacitances may also satisfy the predetermined 3RC settling time. Therefore, a touch report rate of the touch control screen is usually determined by a 3RC settling time that is the longest charging time of a node mutual capacitance on the touch control screen to 95% amplitude of an input signal.

Touch report rate: a touch report rate is equal to a reciprocal of a time taken by one frame (unit: second). The time taken by one frame includes a time taken by self scan, a time taken by mutual scan, a time taken by switch between a self scan mode and a mutual scan mode, and a reset time. Among them, the mutual scan occupies most of the time taken by one frame. The time taken by switch between the self scan mode and the mutual scan mode and the reset time are usually determined by the touch control chip. Typically, under a condition that the time taken by mutual scan satisfies a scan frequency of the touch control chip, the time taken by mutual scan is determined by a 3RC settling time of a body of the touch control screen.

The solutions are illustrated below in detail with reference to specific embodiments.

First Embodiment

As shown in FIG. 1, a schematic view showing a touch control display device of the present disclosure is provided. The touch control device includes an organic light-emitting diode (OLED) display panel 10, a touch control layer 20, a polarizer 30, and a protective cover plate 40.

The OLED display panel 10 includes a substrate 100, a thin-film transistor (TFT) array layer 101, an OLED array layer 102, and an encapsulation layer 103.

The substrate 100 is a flexible substrate. The TFT array layer 101 is disposed on the substrate 100 and includes a plurality of TFTs arranged in an array manner. The OLED array layer 102 is disposed on a side of the TFT array layer 101 away from the substrate 100 and includes a plurality of OLEDs arranged in an array manner. The OLEDs include a plurality of individual anodes, an organic light-emitting layer disposed on the anodes, and a common cathode. That is, the OLEDs share the common cathode which is an entire surface of a metal conductive layer. Each of the OLEDs forms a sub-pixel which includes a red light sub-pixel, a blue light sub-pixel, and a green light sub-pixel. The encapsulation layer 103 is configured to protect the organic layer and the common cathode in the OLED array layer 102, thereby preventing erosion of the organic layer and the common cathode caused by moisture and oxygen. The encapsulation layer 103 is disposed on a side of the OLED array layer 102 away from the TFT array layer 101 and may be a thin-film layer which includes two inorganic layers and an organic layer disposed therebetween.

Figure 2:
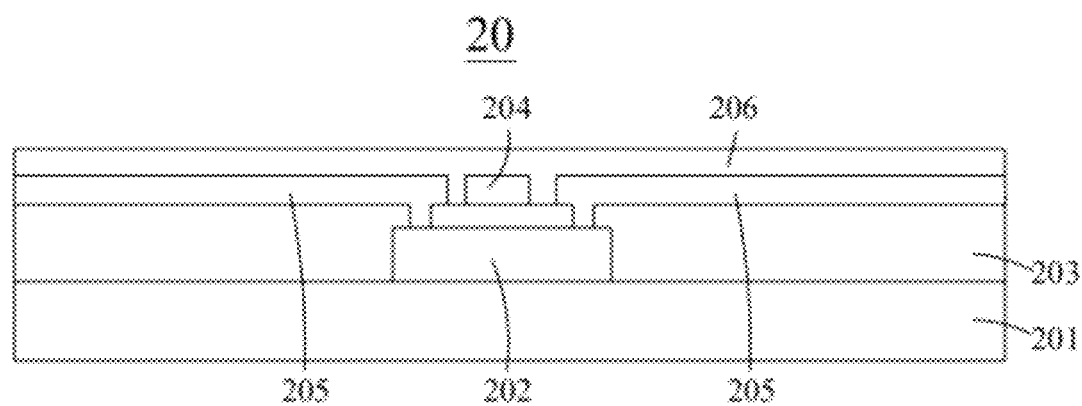
FIG. 2 is a schematic view of a touch control layer in FIG. 1.

As shown in FIG. 2, a schematic view showing the touch control layer in FIG. 1 is provided. The touch control layer 20 includes a buffer layer 201, a second connecting part 202, a first passivation layer 203, a first electrode 204, a second electrode 205, and a second passivation layer 206. The buffer layer 201 is an insulating layer, and a material of the buffer layer 201 includes at least one of silicon nitride or silicon oxide. The second connecting part 202 is disposed on the buffer layer 201 and has conductivity. The second connecting part 202 is two V-shaped bridging lines which are disposed apart from each other. The first passivation layer 203 covers the second connecting part 202 and the buffer layer 201. A material of the first passivation layer 203 includes at least one of silicon nitride or silicon oxide. The first electrode 204 and the second electrode 205 are disposed on the first passivation layer 203, and are electrically insulated from each other. The plurality of first electrodes 204 are connected to each other by a first connecting part (not shown), and are formed on a same layer as the first connecting part, wherein the first electrodes and the first connecting part are integrally formed. The second passivation layer 206 covers the first electrodes 204 and the second electrodes 205. Two adjacent second electrodes 205 are connected to each other by the second connecting part 202, and each of the second electrodes 205 is connected to the second connecting part 202 by a through-hole of the first passivation layer 203.

In the present embodiment, the first electrode 204, the second electrode 205, the second connecting part 202, and the first connecting part form a touch control electrode. An intersection between the second connecting part 202 and the first electrode 204 forms a basic capacitance. The first electrode 204, the second electrode 205, the second connecting part 202, and the first connecting part are formed from a metal grid. The metal grid surrounds the sub-pixel of the OLED array layer, thereby preventing light emitted from the sub-pixel from being blocked.

Second Embodiment

Figure 3:
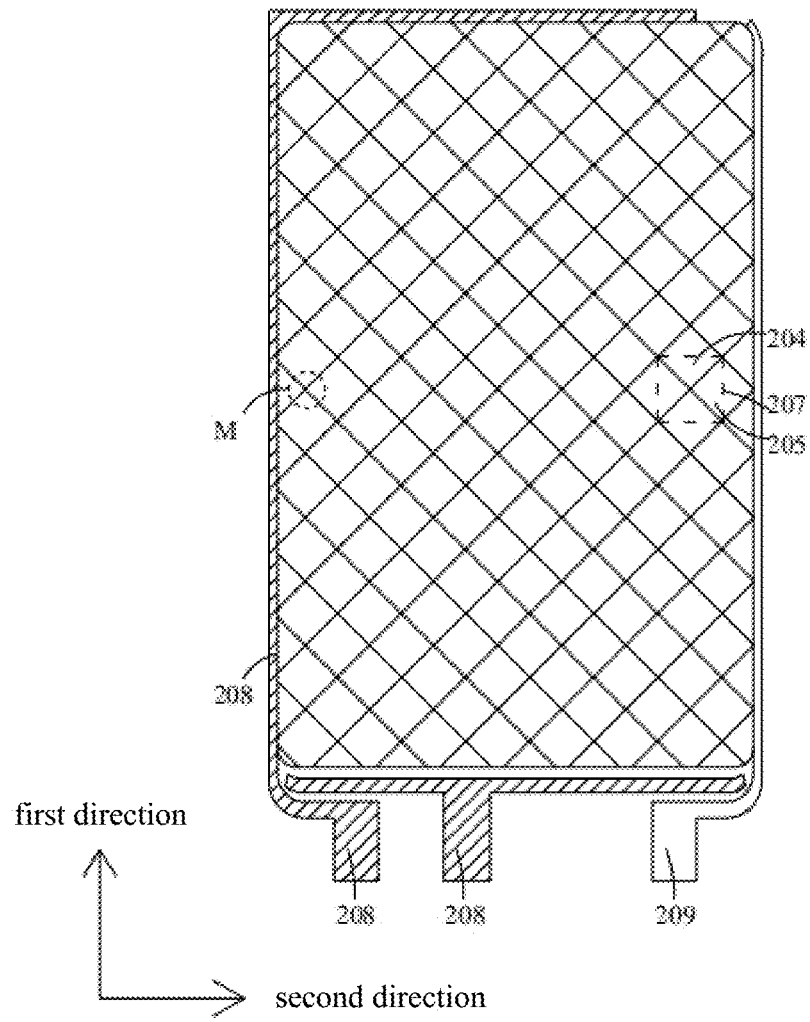
FIG. 3 is a first structural schematic view showing the touch control layer in FIG. 1.

As shown in FIG. 3, a first structural schematic view showing the touch control layer of the touch control display device in FIG. 1 is provided. The first electrodes 204 of the touch control units 207 arranged in a same row along a first direction are electrically connected to each other to form a plurality of first electrode channels. The second electrodes 205 of the touch control units 207 arranged in a same row along a second direction are electrically connected to each other to form a plurality of second electrode channels. Two ends of each of the first electrode channels are connected to a first leading line 208, and an end of each of the second electrode channels is connected to a second leading line 209. That is, the touch control layer has a 2T1R structure.

In the present embodiment, the first electrode is a driving electrode, and the second electrode is a sensing electrode. There are 17 first electrode channels along the second direction, and there are 37 second electrode channels along the first direction, wherein the 37 second electrode channels are sequentially arranged. Among distances from each of the 37 second electrode channels to the touch control driver chip, the distance from the $37^{th}$ second electrode channel to the touch control driver chip is the farthest. In the second direction, four first electrode channels form a group to scan. For example, the $1^{st}$ electrode channel to the $4^{th}$ electrode form a group to scan, the $5^{st}$ electrode channel to the $8^{th}$ electrode form a group to scan, the $9^{st}$ electrode channel to the $12^{th}$ electrode form a group to scan, the $13^{st}$ electrode channel to the $16^{th}$ electrode form a group to scan, and the $17^{th}$ electrode forms a group to scan. Each of the group of the first electrode channels scan four times. A corresponding waveform is inputted during each scan process, and the waveform includes 48 standard square waves. Therefore, a time taken by a complete mutual scan process of the touch control display device is 5*4*48*2*t, wherein one standard square wave takes 2*t, and t is the longest charging time taken by the node mutual capacitance to 95% of an input voltage.

In the present embodiment, a node mutual capacitance M, which takes the longest time to reach 95% of the input voltage, is located at a middle portion of the touch control layer. For example, the node mutual capacitance M is located at an intersection between the $1^{st}$ electrode channel and the $19^{th}$ electrode channel.

A mutual scan time of a screen body mainly consists of n groups of mutual scan waveforms. A time taken by the n groups of mutual scan waveforms constitutes the entire mutual scan time. Once a number of channels of the screen body is determined, N is usually relevant to a number of the first electrode channels of the screen body and a driving group of the first electrode channels.

Third Embodiment

Figure 4:
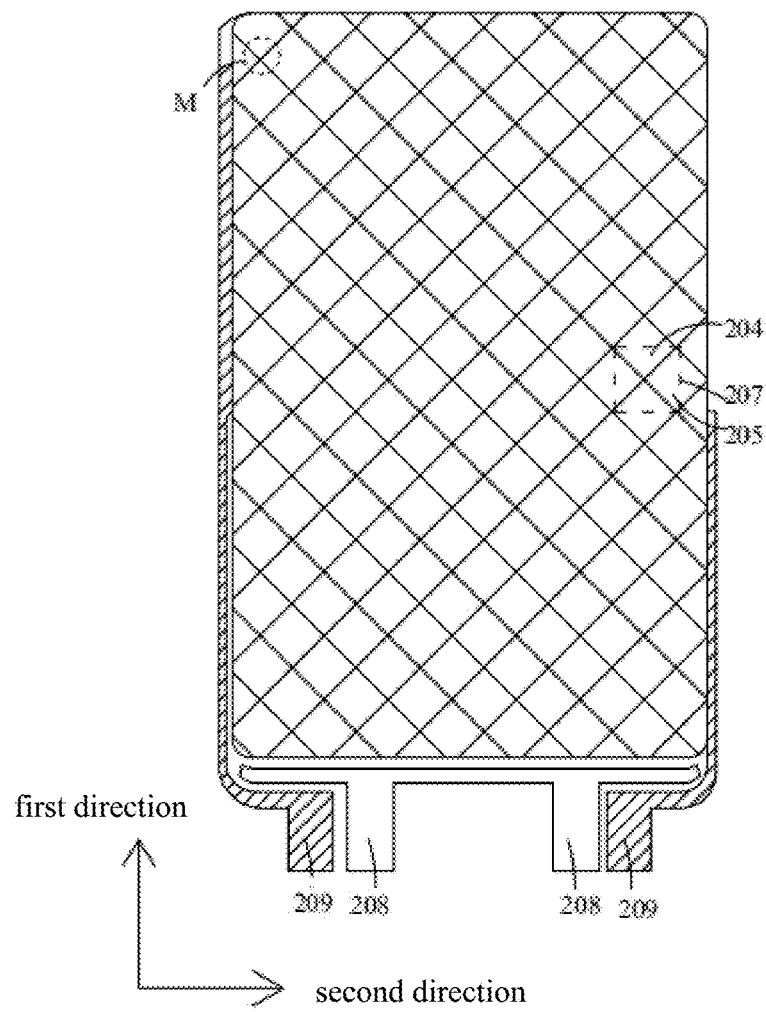
FIG. 4 is a second structural schematic view showing the touch control layer in FIG. 1.

As shown in FIG. 4, a second structural schematic showing the touch control layer of the touch display device in FIG. 1 is provided. The touch control layer as shown in FIG. 4 is basically similar to the touch control layer as shown in FIG. 3, and differences therebetween are: in the present embodiment, an end of each of the first electrode channels is connected to the first leading line 208, and an end of each of the second electrode channels is connected to the second leading line 209, that is, the touch control layer has a 1T1R structure. In the present embodiment, arrangements of the first electrode and the second electrode are same as those as shown in FIG. 3, and a scan method (group-by-group) is same as that described in the second embodiment.

In the present embodiment, the node mutual capacitance M, which takes the longest charging time to reach 95% of an input voltage, is located at a position far from the touch control chip. For example, the node mutual capacitance M is located at an intersection between the $1^{st}$ electrode channel and the $37^{th}$ second electrode channel.

Fourth Embodiment and First Comparison Example

The present embodiment and the first comparison example aim to research effects of electrical resistances of a sensing electrode, a parasitic capacitance, and a sensing electrode channel on a charging time taken by a node mutual capacitance to reach 95% of an input voltage. Simulation results of touch control units 1 to 3 and the first comparison example are shown in FIG. 1.

Figure 5A:
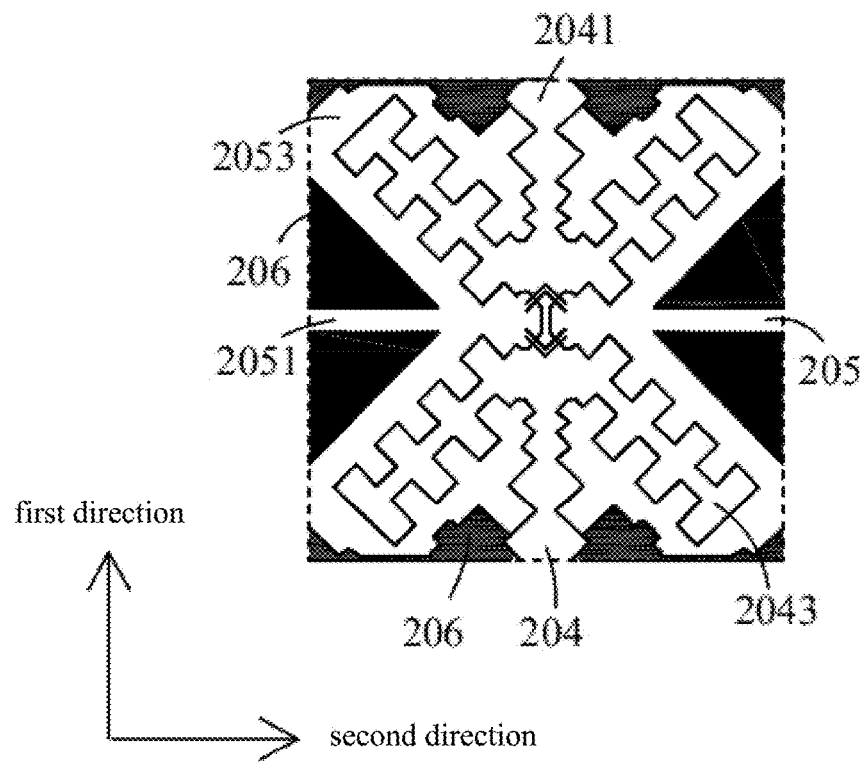
FIG. 5A is a schematic view showing a touch control unit 1 according to an embodiment of the present disclosure.

As shown in FIG. 5A, a schematic view showing the touch control unit 1 of the present embodiment is provided. The touch control unit 1 includes a first electrode 204 and a second electrode 205. The first electrode 204 includes a first stem electrode 2041 and a first branch electrode 2043. The first branch electrode 2043 extends from an intersection between the first stem electrode 2041, the first electrode 204, and the second electrode 205. The first stem electrode 2041 extends along a first direction, and an angle between the first branch electrode 2043 and the first stem electrode 2041 is 45°. The second electrode 205 includes a second stem electrode 2051 and a second branch electrode 2053. The second branch electrode 2053 extends from an intersection between the second stem electrode 2051, the first electrode 204, and the second electrode 205, and an angle between the second branch electrode 2053 and the second stem electrode 2051 is 45°. The second branch electrode 2053 surrounds the first branch electrode 2043 adjacent to the second branch electrode 2053. In the second direction, two adjacent touch control electrodes are connected to two adjacent second branch electrodes 2053, a region surrounded by the second stem electrodes 2051 and the second branch electrodes 2053 of the two adjacent touch control electrodes is provided with a floating electrode 206, and a ratio of an area of the region surrounded by the second stem electrodes 2051 and the second branch electrodes 2053 of the two adjacent touch control electrodes to an area of each of the second branch electrodes 2053 is 4:5. The floating electrode 206, the first electrode 204, and the second electrode 205 are electrically insulated from each other. In the first direction, a region surrounded by two adjacent first stem electrodes and two adjacent second branch electrodes 2053 of two adjacent touch control units is provided with the floating electrode 206, thereby preventing short circuiting caused by separation of two adjacent second branch electrodes 2053 of two adjacent touch control units.

Figure 5B:
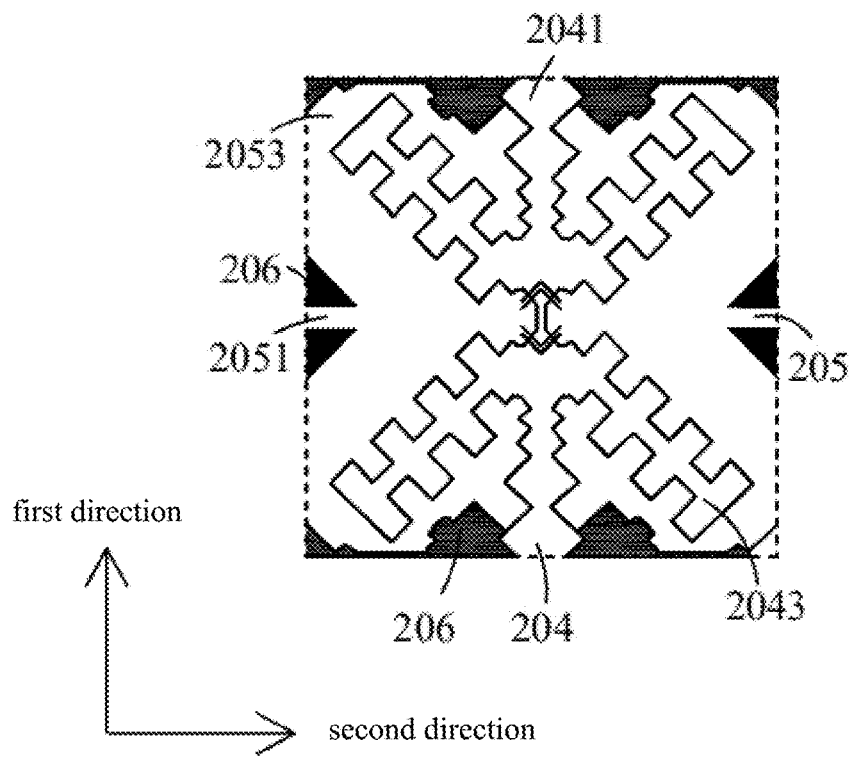
FIG. 5B is a schematic view showing a touch control unit 2 according to an embodiment of the present disclosure.

As shown in FIG. 5B, a schematic view showing a touch control unit 2 of the present embodiment is provided. The touch control unit 2 as shown in FIG. 5B and the touch control unit 1 as shown in FIG. 5A are basically similar, and differences therebetween are: in the present embodiment, in the second direction, an area of the floating electrode 206 disposed in a region surrounded by two adjacent second stem electrodes 2051 and two adjacent second branch electrodes 2053 of two adjacent touch control units to an area of each of the second branch electrodes 2053 is 1:10.

Figure 5C:
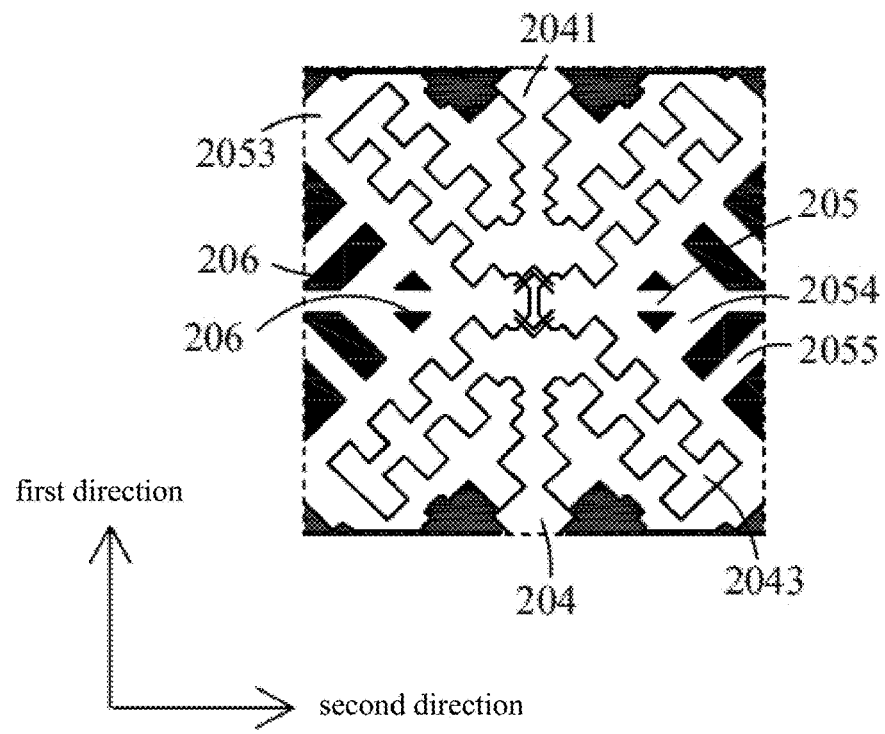
FIG. 5C is a schematic view showing a touch control unit 3 according to an embodiment of the present disclosure.

As shown in FIG. 5C, a schematic view showing a touch control unit 3 of the present embodiment is provided. The touch control unit 3 as shown in FIG. 5C is basically similar to the touch control unit 1 as shown in FIG. 5A, and differences therebetween are: in the present embodiment, the second electrode 205 includes a first connecting branch electrode 2054 and a second connecting branch electrode 2055. An end of the first connecting branch electrode 2054 is connected to the second stem electrode 2051, and another end of the first connecting branch electrode 2054 is connected to the second branch electrode 2053. A region of the first connecting branch electrode 2054, the second stem electrode 2051, and a region surrounded by the second branch electrode 2053 of each of the touch control units is provided with a floating electrode 206. An end of the second connecting branch electrode 2055 is connected to the second branch electrode 2053, and another end of the second connecting branch electrode 2055 is connected to the second connecting branch electrode 2055 of adjacent touch control units in the second direction. A region surrounded by the first connecting branch electrode 2054, the second connecting branch electrode 2055, the second branch electrode 2053, and the second stem electrode 2051 of the touch control unit is provided with a floating electrode 206.

The touch control unit of the first comparison example and the touch control unit as shown in FIG. 5A are basically similar, a difference therebetween is: in the first comparison example, the region surrounded by the second stem electrode 2051 and the second branch electrode 2053 of two adjacent touch control units in the second direction is not provided with the floating electrode 206.

TABLE 1 simulation results of the touch control units 1 to 3 and the first comparison example

|  | Touch control unit 1 | Touch control unit 2 | Touch control unit 3 | Comparison 1 |
|---|---|---|---|---|
| Unit Cs_Tx (pF) | 10.268 | 9.58 | 10 | 10 |
| Unit Cs_Rx (pF) | 10.332 | 16.02 | 13 | 19 |
| Unit R_Tx (Ω) | 33.2 | 33.2 | 33.2 | 33.2 |
| Unit R_Rx (Ω) | 27.6 | 27.6 | 10 | 27.5 |
| R_Rx (Ω) | 1980 | 1980 | 1980 | 1980 |
| 3RC settling time (μs) | 1.326 | 1.326 | 1.125 | 1.565 |
| Time taken by mutual scan (μs) | 2545.92 | 2561.28 | 2160 | 3004.8 |
| Time taken by switch between a mutual scan mode and a self scan mode (μs) | 102 | 102 | 102 | 102 |
| Reset time (μs) | 1000 | 1000 | 1000 | 1000 |
| Time taken by self scan (μs) | 520 | 520 | 520 | 520 |
| Time taken by one frame (μs) | 4167.92 | 4167.92 | 3782 | 4626.8 |
| Touch report rate (Hz) | 240 | 240 | 264 | 216 |

Wherein, unit Cs Tx is a parasitic capacitance of the first electrode of the touch control unit, unit Cs Rx is a parasitic capacitance of the second electrode, unit R Tx is an electrical resistance of the first electrode of the touch control unit, unit R Rx is an electrical resistance of the touch control unit, R Rx is an electrical resistance of the second leading line 209 which is connected to a node mutual capacitance on the touch control layer which takes the longest charging time to reach 95% of an input voltage, and 3RC settling time is the longest charging time taken by the node mutual capacitance to reach 95% of the input voltage.

The driving structure of the touch control layer of the second embodiment is applied to the above touch control units 1-3 and the first comparison example. When the time taken by switch between the self scan mode and the mutual scan mode, the time taken by self scan, and the reset time are equal, the 3RC settling time of the touch control units 1 to 3 is less than the 3RC settling time of the first comparison example. The 3RC settling time of the touch control units 1-3 is less than 1.35 μs. The touch report rate of the touch control units 1 to 3 is greater than the touch report rate of the first comparison example. The highest touch report rate of the touch control units 1 to 3 is 264 Hz, which is higher than at least 11.11% of the touch report rate of the first comparison example. This is because a parasitic capacitance of the second electrode 205 of the touch control units 1-3 is less than a parasitic capacitance of the second electrode 205 of the first comparison example. The 3RC settling time of the touch control unit 3 is relatively small. This is because the touch unit 3 includes the first connecting branch electrode 2054 and the second connecting branch electrode 2055, which increases a number of current transmitting channels of the second electrode, and reduces an electrical resistance of the second electrode 205. Reduction of the electrical resistance of the second electrode 205 allows the charging time taken by the node mutual capacitance to reach 95% input voltage to be reduced. The 3RC settling time of the touch control unit 2 and the 3RC settling time of the touch control unit 1 are same. This is because a parasitic capacitance of the second electrode 205 of the touch control unit 1 is far greater than a parasitic capacitance of the second electrode 205 of the touch control unit 2, and a parasitic capacitance of the first electrode 204 of the touch control unit 1 is slightly greater than a parasitic capacitance of the first electrode 204 of the touch control unit 2. Since the first electrode 204 is a driving electrode configured to input scan signals, compared with a reduction of the parasitic capacitance of the second electrode 205, a reduction of the parasitic capacitance of the first electrode 204 can easily reduce the 3RC settling time. Of course, the reduction of the parasitic capacitance of the second electrode 25 may also reduce the 3RC settling time.

It should be noted that when the driving electrode of the touch control layer of the second embodiment is applied to the touch control unit 1, the 3RC settling time is 1.326 µs, and a frequency of a mutual scan waveform outputted by the touch control chip is 377 kHz.

Fifth Embodiment and Second Comparison Example

The present embodiment and the second comparison example aim to research effects of disposing the floating electrode in the driving electrode and the sensing electrode of the touch control unit on the electrical resistance and the parasitic capacitance of the driving electrode and the sensing electrode, and research effects of the electrical resistance and the parasitic capacitance of the driving electrode and the sensing electrode on the charging time taken by the node mutual capacitance to reach 95% of the input voltage. Simulation results of the touch control units 4 to 7 and the second comparison example are shown in Table 2.

Figure 6A:
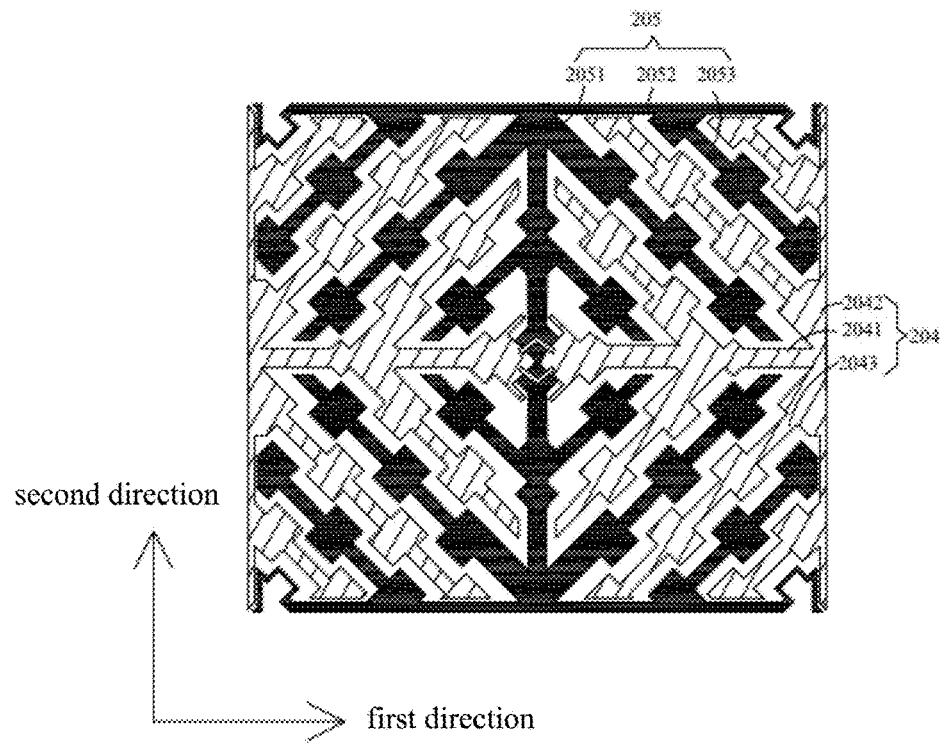
FIG. 6A is a schematic view showing a touch control unit 4 according to an embodiment of the present disclosure.
Figure 6B:
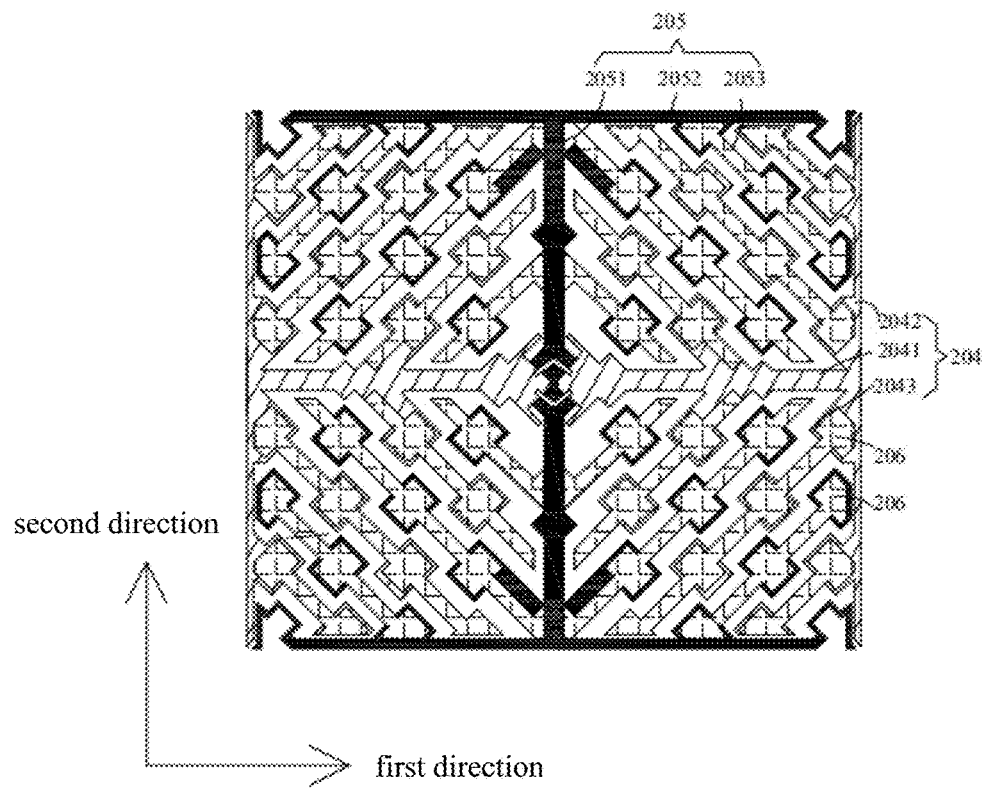
FIG. 6B is a schematic view showing a touch control unit 5 according to an embodiment of the present disclosure.

As shown in FIG. 6A, a schematic view showing a touch control unit 4 of the present embodiment is provided. The touch control unit 4 includes a first electrode 204 and a second electrode 205. The first electrode 204 includes a first stem electrode 2041, a first vertical stem electrode 2042, and a first branch electrode 2043. The first stem electrode 2041 is vertical to the first vertical stem electrode 2042. The first branch electrode 2043 extends from the first stem electrode 2041 and the first vertical stem electrode 2042, an angle between first branch electrode 2043 extending from the first stem electrode 2041 and the first stem electrode 2041 is 45°, and an angle between the first branch electrode 2043 extending from the first vertical stem electrode 2042 and the first vertical stem electrode 2042 is 45°. The second electrode 205 includes a second stem electrode 2051, a second vertical stem electrode 2052, and a second branch electrode 2053. The second stem electrode 2051 is vertical to the second vertical stem electrode 2052. The second branch electrode 2053 extends from the second stem electrode 2051 and the second vertical stem electrode 2052. An angle between the second branch electrode 2053 extending from the second stem electrode 2051 and the second stem electrode 2051 is 45°. An angle between the second branch electrode 2053 extending from the second vertical stem electrode 2052 and the second vertical stem electrode 2052 is 45°. At an intersection between the first electrode 204 and the second electrode 205, two first stem electrodes 2041 are connected to each other by two pairs of V-shaped bridging lines which are spaced apart from each other, and two second stem electrodes 2051 are connected to each other by a connecting part which is disposed on a same layer as the first electrode 204 and the second electrode 205. The first electrode 204 and the second electrode 205 are symmetrical to the first stem electrode 2041 and the second stem electrode 2051. The first branch electrode 2043 is parallel to the second branch electrode 2053 adjacent to the first branch electrode 2043. Part of the first branch electrode 2043 intersects with part of the second branch electrode 2053. The first branch electrode 2043 includes a first extended-width part and a first connecting part corresponding thereto. The second branch electrode 2053 includes a second extended-width part and a second connecting part corresponding thereto. The first extended-width part of the first branch electrode 2043 corresponds to the second connecting part of the second branch electrode 2053 adjacent thereto. The first connecting part of the first branch electrode 2043 corresponds to the second extended-width part of the second branch electrode 2053 adjacent thereto.

As shown in 6B, a schematic view showing a touch control unit 5 of the present embodiment is provided. The touch control unit 5 and the touch control unit 4 are basically similar, and differences therebetween are: in the present embodiment, the floating electrode 206 is disposed in the first branch electrode 2043 and the second branch electrode 2053, but is not disposed in the first stem electrode 2041 and the second stem electrode 2051. The floating electrode 206, the first electrode 204, and the second electrode 205 are electrically insulated from each other. The floating electrode 206 does not load an electrical signal.

Figure 6C:
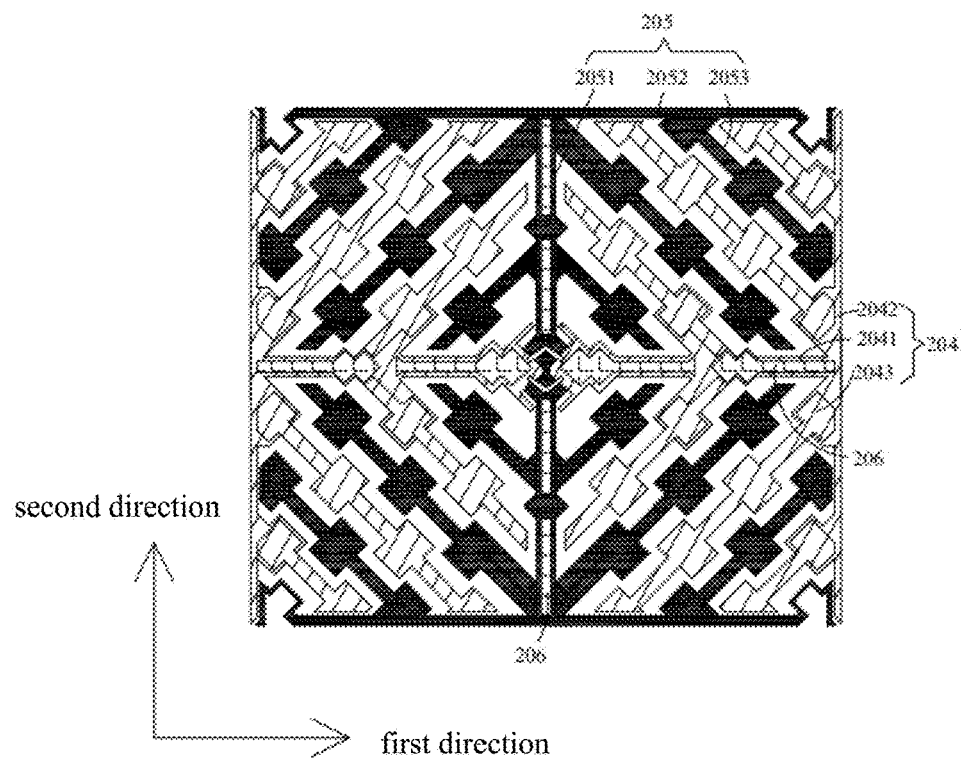
FIG. 6C is a schematic view showing a touch control unit 6 according to an embodiment of the present disclosure.

As shown in FIG. 6C, a schematic view showing a touch control unit 6 of the present embodiment is provided. The touch control unit 6 and the touch control unit 5 are basically similar, and differences therebetween are: in the present embodiment, the floating electrode 206 is disposed in the first stem electrode 2041 and the second stem electrode 2051, but is not disposed in the first branch electrode 2043 and the second branch electrode 2053. A ratio of an area of the first stem electrode 2041 to an area of the floating electrode 206 in the first stem electrode 2041 is 7:3. A ratio of an area of the second stem electrode 2051 to an area of the floating electrode 206 in the second stem electrode 2051 is 7:3. The area of the first stem electrode 2041 does not include the area of the floating electrode 206, and the area of the second stem electrode 2051 does not include the area of the floating electrode 206.

Figure 6D:
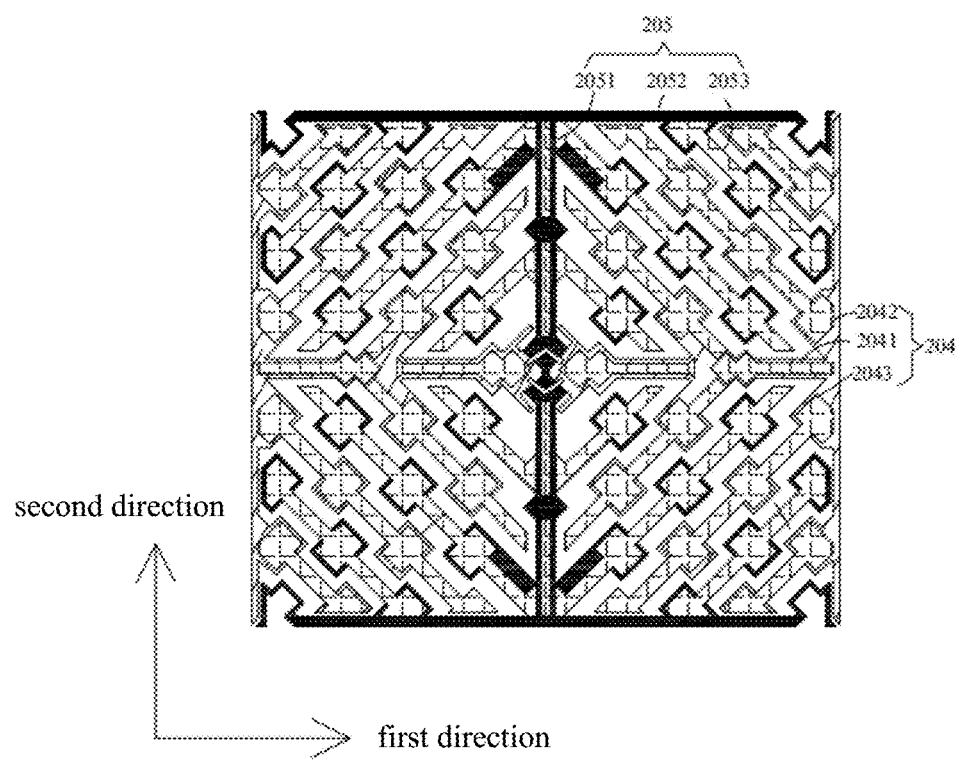
FIG. 6D is a schematic view showing a touch control unit 7 according to an embodiment of the present disclosure.

As shown in FIG. 6D, a schematic view showing a touch control unit 7 of the present embodiment is provided. The touch control unit 7 and the touch control unit 5 are basically similar, and differences therebetween are: the first stem electrode 2041, the second stem electrode 2051, the first branch electrode 2043, and the second branch electrode 2053 are provided with the floating electrode 206. A ratio of an area of the first stem electrode 2041 to an area of the floating electrode 206 in the first stem electrode 2041 is 7:3. A ratio of an area of the second stem electrode 2051 to an area of the floating electrode 206 in the second stem electrode 2051 is 7:3. The area of the first stem electrode 2041 does not include the area of the floating electrode 206, and the area of the second stem electrode 2051 does not include the area of the floating electrode 206.

The touch control unit of the second comparison example and the touch control unit as shown in FIG. 6C are basically similar, and differences therebetween are: in the touch control unit of the second comparison example, a ratio of an area of the first stem electrode 2041 to an area of the floating electrode 206 in the first stem electrode 2041 is 5:5, and a ratio of an area of the second stem electrode 2051 to an area of the floating electrode 206 in the second stem electrode 2051 is 5:5.

TABLE 2 simulation results of the touch control units
4 to 7 and the second comparison example

| Simulation object | Touch control unit 4 | Touch control unit 5 | Touch control unit 6 | Touch control unit 7 | Comparison 2 |
|---|---|---|---|---|---|
| Unit Cs_Tx (pF) | 17.5 | 12 | 14 | 4 | 13 |
| Unit Cs_Rx (pF) | 18 | 12.5 | 16 | 4.5 | 14 |
| Unit R_Tx (Ω) | 35 | 35.5 | 48 | 48.5 | 53 |
| Unit R_Rx (Ω) | 33 | 34 | 46 | 47 | 52 |
| R_Rx (Ω) | 1980 | 1980 | 1980 | 1980 | 1980 |
| 3RC settling constant (μs) | 1.445 | 1.314 | 1.495 | 1.055 | 1.605 |

The schematic view showing the touch structure of the touch control layer as shown in FIG. 4 is applied to the touch control units 4 to 7 and the second comparison example.

As shown in Table 2, the 3RC settling times of the touch control units 4 to 7 are less than the 3RC settling time of the second comparison example, and are less than 1.5 μs. This is because, in the second comparison example, the first stem electrode 2041 of the first electrode 204 and the second stem electrode 2051 of the second electrode 205 are provided with more floating electrodes 206, resulting in greater resistance of the first electrode 204 and the second electrode 205. In the second comparison example, although parasitic capacitances of the first electrode 204 and the second electrode 205 are less, the 3RC settling time is up to 1.605 μs because disadvantages due to great resistance of the first electrode 204 and the second electrode 205 outweigh advantages due to less parasitic capacitances of the first electrode 204 and the second electrode 205 in terms of charging time of the node mutual capacitance. The 3RC settling time of the touch control unit 4 is greater than the 3RC settling time of the touch control unit 5. This is because the first branch electrode 2043 and the second branch electrode 2053 of the touch control unit 5 are provided with the floating electrode 206. Since areas of the first electrode 204 and the second electrode 205 are reduced, parasitic capacitances of the first electrode 204 and the second electrode 205 can be reduced without affecting electrical resistances thereof. The 3RC settling time of the touch control unit 6 is greater than the 3RC settling time of the touch control unit 4. This is because the first stem electrode 2041 and the second stem electrode 2051 of the touch control unit 6 are provided with floating electrode 206. When areas of the first electrode 204 and the second electrode 205 are reduced to reduce parasitic capacitances of the first electrode and the second electrode 205, electrical resistances of the first stem electrode 2041 and the second stem electrode 2051 are increased. The first stem electrode 2041 and the second stem electrode 2051 are mainly configured to transmit currents. Great resistances of the first electrode 204 and the second electrode 205 result in a great 3RC settling time. The 3RC settling time of the touch control unit 7 is less than the 3RC settling time of the touch control unit 6. This is because the first branch electrode 2043 and the second branch electrode 2053 of the touch control unit 7 are provided with the floating electrode 206, which reduces parasitic capacitances of the first electrode 204 and the second electrode 205, thereby reducing the 3RC settling time.

Sixth Embodiment and Third Comparison Example

The present embodiment and the third comparison example aim to research effects of disposing an extended-width part at an intersection between the first electrode and the second electrode on an electrical resistance, and effects of electrical resistance reduction on a charging time taken by the node mutual capacitance to reach 95% of an input voltage (3RC settling time). Simulation results of a touch control unit 8 and the third comparison example are shown in Table 3.

Figure 7A:
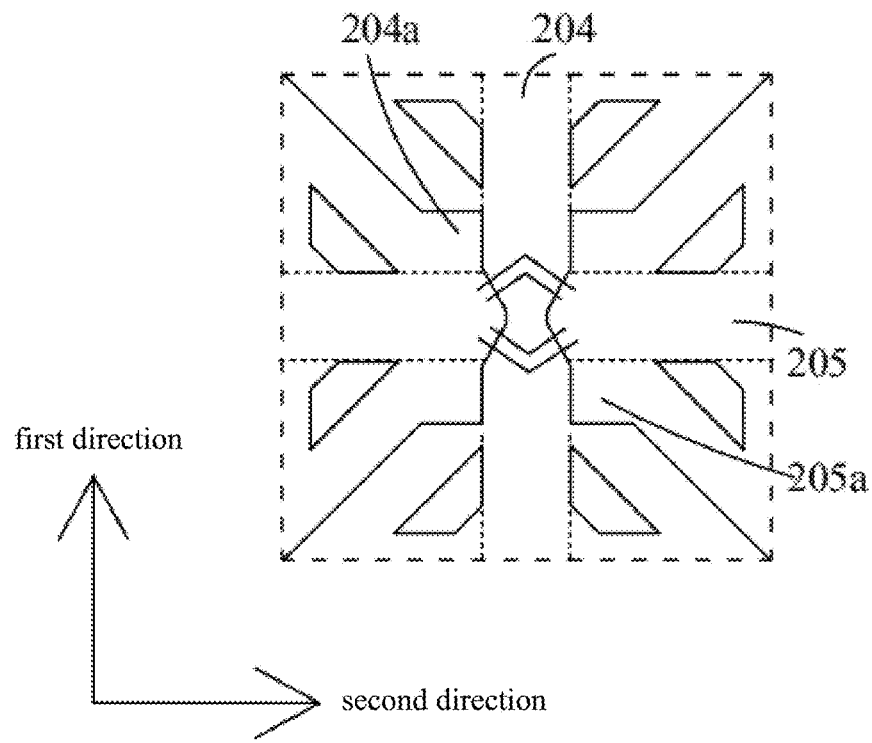
FIG. 7A is a schematic view showing a touch control unit 8 according to an embodiment of the present disclosure.
Figure 7B:
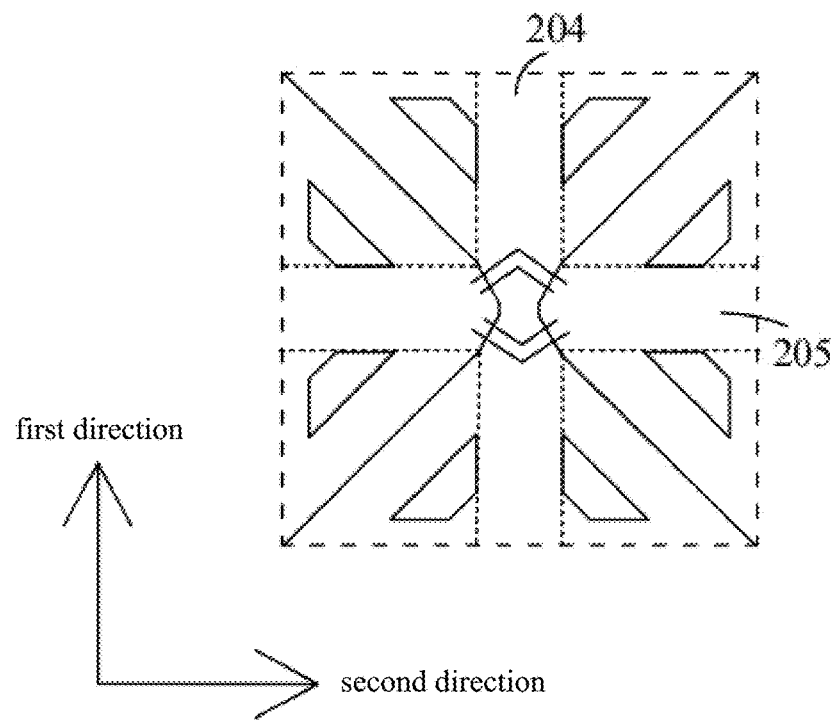
FIG. 7B is a schematic view of a touch control unit according to a third comparison example.

As shown in FIG. 7A, a schematic view showing the touch control unit 8 of the present embodiment is provided. The touch control unit 8 includes a first electrode 204 and a second electrode 205. The first electrode 204 includes two first isosceles right triangle (IRT) electrodes. The second electrode 205 includes two second IRT electrodes. The two first IRT electrodes of the first electrode 204 are electrically connected to each other along the first direction, and the two second IRT electrodes of the second electrode are electrically connected to each other along the second direction. A position on two adjacent edges of the first IRT electrodes and near the intersection between the first electrode 204 and the second electrode 205 is provided with a recess part 204a, a position on two adjacent edges of the second IRT electrodes is provided with a protrusion part 205a, and the recess part 204a corresponds to the protrusion part 205a. In the present embodiment, the first electrode 204 is a driving electrode, and the second electrode 205 is a sensing electrode.

As shown in 7B, a schematic view of the third comparison example is provided. The touch control unit of the third comparison example and the touch control unit 8 are basically similar, and a difference therebetween is: the touch control unit of the third comparison example is not provided with the recess 204a and the protrusion part 205a.

TABLE 3 simulation results of the touch control unit 8 and the
touch control unit of the third comparison example

| | Touch control unit 8 | Comparison 3 |
|---|---|---|
| Unit Cs_Tx (pF) | 9.5 | 10 |
| Unit Cs_Rx (pF) | 10.3 | 10.1 |
| Unit R_Tx (Ω) | 48 | 52 |
| Unit R_Rx (Ω) | 45 | 52 |
| R_Rx (Ω) | 1980 | 1980 |
| 3RC settling time (μs) | 1.385 | 1.455 |

The touch control structure as shown in FIG. 3 is applied to the touch control unit 8 and the touch control unit of the third comparison example. The 3RC settling time of the touch control unit 8 is less than the 3RC settling time of the third comparison example. This is because, in the touch control unit 8, the protrusion part 205a is disposed at a position of the second electrode 205 near the intersection between the first electrode 204 and the second electrode 205, which increases a width of a stem electrode of the second electrode 205 near the intersection between the first electrode 204 and the second electrode 205, thereby reducing an electrical resistance of the second electrode 205. Furthermore, defining the recess part 204a on the first electrode 204 would not significantly affect an electrical resistance of a stem electrode of the first electrode 204. Reduction of the electrical resistance of the second electrode 205 results in less 3RC settling time of the touch control unit 8.

The description of the above embodiments is only for helping to understand the technical solution of the present disclosure and core ideas thereof, and it is understood by those skilled in the art that many changes and modifications to the described embodiment can be carried out without departing from the scope and the spirit of the disclosure that is intended to be limited only by the appended claims.

What is claimed is:

1. A touch control display device, comprising a touch control layer and a display panel, wherein the touch control layer is disposed on a side of the display panel and comprises a plurality of touch control units, each of the touch control units comprises a first electrode disposed along a first direction and a second electrode disposed along a second direction, the first electrode and the second electrode are electrically insulated from each other, and the first direction and the second direction are different;

the display panel comprises an organic light-emitting diode (OLED) array layer and an encapsulation layer, the encapsulation layer is disposed between the touch control layer and the OLED array layer, and a thickness of the encapsulation layer ranges from 5μm to 15 μm;

in each of the touch control units, an electrical resistance of the first electrode is greater than 0Ω and is less than or equal to 50Ω, and a parasitic capacitance of the first electrode is greater than 0 pF and is less than or equal to 18 pF;

an electrical resistance of the second electrode is greater than 0Ω and is less than or equal to 50Ω, and a parasitic capacitance of the second electrode is greater than 0 pF and is less than or equal to 18 pF; and the parasitic capacitance of the first electrode is less than the parasitic capacitance of the second electrode, the first electrode is a driving electrode, and the second electrode is a sensing electrode.

2. The touch control display device of claim 1, wherein in each of the touch control units, the electrical resistance of the first electrode is greater than or equal to 5Ω and is less than or equal to 35Ω, and the parasitic capacitance of the first electrode is greater than or equal to 2 pF and is less than or equal to 17 pF; and the electrical resistance of the second electrode is greater than or equal to 5Ω and is less than or equal to 35Ω, and the parasitic capacitance of the second electrode is greater than or equal to 2 pF and is less than or equal to 17 pF.

3. The touch control display device of claim 1, further comprising a first leading line, a second leading line, and a touch control chip, wherein the first leading line is electrically connected to the first electrode of each of the touch control units, the second leading line is electrically connected to the second electrode of each of the touch control units, the first leading line and the second leading line are electrically connected to the touch control chip and an electrical resistance of the first leading line and an electrical resistance of the second leading line are greater than 0Ω and are less than or equal to 2500Ω.

4. The touch control display device of claim 3, wherein in each of the touch control units, the electrical resistance of the first electrode is greater than or equal to 8Ω and is less than or equal to 30Ω, and the parasitic capacitance of the first electrode is greater than or equal to 5 pF and is less than or equal to 13 pF;

the electrical resistance of the second electrode is greater than or equal to 8Ω and is less than or equal to 30Ω, and the parasitic capacitance of the second electrode is greater than or equal to 5 pF and is less than or equal to 13 pF; and the electrical resistance of the first leading line and the electrical resistance of the second leading line are greater than or equal to 100Ω and are less than or equal to 2000Ω.

5. The touch control display device of claim 3, wherein the electrical resistance of the first leading line and the electrical resistance of the second leading line are greater than or equal to 200Ω and are less than or equal to 2200Ω.

6. The touch control display device of claim 1, wherein in each of the touch control units, the first electrode and the second electrode form a node mutual capacitance, and a charging time taken by the node mutual capacitance to reach a predetermined voltage is less than or equal to a threshold duration of time.

7. The touch control display device of claim 6, further comprising a touch control chip, wherein a percent ratio of the predetermined voltage to an input voltage ranges from 90% to 100%, the threshold duration of time is less than or equal to 1.5 μs and is greater than 0 μs, and the input voltage is outputted from the touch control chip to the touch control units.

8. The touch control display device of claim 7, wherein the percent ratio of the predetermined voltage to the input voltage is 95%, and the threshold duration of time is 1.35μs.

9. The touch control display device of claim 1, wherein a number of the touch control units arranged at a same row along the first direction is greater than a number of the touch control units arranged at a same row along the second direction.

10. The touch control display device of claim 9, wherein in each of the touch control units, an area of the first electrode is less than an area of the second electrode.

11. The touch control display device of claim 1, wherein the first electrode comprises a first stem electrode extending along the first direction and at least one first branch electrode extending from the first stem electrode; and the second electrode comprises a second stem electrode extending along the second direction and at least one second branch electrode extending from the second stem electrode.

12. The touch control display device of claim 11, wherein a floating electrode is disposed in the first stem electrode; and/or the floating electrode is disposed in at least one of the at least one first branch electrode; and/or the floating electrode is disposed in at least one of the at least one second branch electrode; and/or the floating electrode, the first electrode, and the second electrode are electrically insulated from each other.

13. The touch control display device of claim 12, wherein the floating electrode is disposed in at least one of the at least one first branch electrode; and/or the floating electrode is disposed in at least one of the at least one second branch electrode.

14. The touch control display device of claim 11, wherein the second electrode further comprises a first connecting branch electrode, an end of the first connecting branch electrode is connected to the second stem electrode, another end of the first connecting branch electrode is connected to the at least one second branch electrode, an area surrounded by the first connecting branch electrode, the second stem electrode, and the at least one second branch electrode of each of the touch control units is provided with a floating electrode, and the floating electrode, the first electrode, and the second electrode are electrically insulated from each other.

15. The touch control display device of claim 14, wherein the second electrode further comprises a second connecting branch electrode, an end of the second connecting branch electrode is connected to the at least one second branch electrode, another end of the second connecting branch electrode is electrically connected to the second connecting branch electrode of the touch control units which are adjacent to each other along the second direction, and an area surrounded by the first connecting branch electrode, the second connecting branch electrode, the at least one second branch electrode, and the second stem electrode in each of the touch control units is provided with the floating electrode.

16. The touch control display device of claim 11, wherein the at least one second branch electrode extends from an end of the second stem electrode near an intersection between the second stem electrode and the first stem electrode; and in the second direction, two adjacent ones of the second branch electrodes of two adjacent ones of the touch control units are connected to each other at ends of the two adjacent ones of the second branch electrodes away from other ends of the two adjacent ones of the second branch electrodes connected to the second stem electrode, a region surrounded by two adjacent ones of the second branch electrodes and two adjacent ones of the second stem electrodes of two adjacent ones of the touch control units is provided with a floating electrode, and the floating electrode, the first electrode, and the second electrode are electrically insulated from each other.

17. The touch control display device of claim 11, wherein at least one of the first stem electrode or the second stem electrode is provided with an extended-width part near an intersection between the first electrode and the second electrode.

* * * * *

UNITED STATES PATENT AND TRADEMARK OFFICE
CERTIFICATE OF CORRECTION

| | | |
|---|---|---|
| PATENT NO. | : 11,460,968 B2 | |
| APPLICATION NO. | : 17/265132 | |
| DATED | : October 4, 2022 | |
| INVENTOR(S) | : Jian Ye | |

It is certified that error appears in the above-identified patent and that said Letters Patent is hereby corrected as shown below:

On the Title Page

Item (73) should be corrected as follows:
(73) Assignee: WUHAN CHINA STAR OPTOELECTRONICS SEMICONDUCTOR DISPLAY TECHNOLOGY CO., LTD., Wuhan (CN)

Signed and Sealed this
Ninth Day of January, 2024

Katherine Kelly Vidal
*Director of the United States Patent and Trademark Office*